United States Patent
Osman et al.

(10) Patent No.: US 12,019,795 B2
(45) Date of Patent: Jun. 25, 2024

(54) MOTION BLUR COMPENSATION THROUGH EYE TRACKING

(71) Applicant: Sony Interactive Entertainment Inc., Tokyo (JP)

(72) Inventors: Steven Osman, San Mateo, CA (US); Kazuyuki Arimatsu, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 441 days.

(21) Appl. No.: 17/392,983

(22) Filed: Aug. 3, 2021

(65) Prior Publication Data
US 2023/0042920 A1 Feb. 9, 2023

(51) Int. Cl.
*G06F 3/01* (2006.01)
*G06T 7/20* (2017.01)

(52) U.S. Cl.
CPC .............. *G06F 3/013* (2013.01); *G06F 3/012* (2013.01); *G06T 7/20* (2013.01); *G06T 2207/20201* (2013.01)

(58) Field of Classification Search
CPC .......... G06F 3/013; G06F 3/012; G06F 3/011; G06F 3/016; G06T 7/20; G06T 2207/20201
See application file for complete search history.

(56) References Cited

U.S. PATENT DOCUMENTS

| | | | |
|---|---|---|---|
| 6,956,576 B1 | 10/2005 | Deering et al. | |
| 2007/0252795 A1* | 11/2007 | Shiomi | G09G 3/3648 345/87 |
| 2015/0022435 A1* | 1/2015 | Luebke | G06F 3/013 345/156 |
| 2018/0008141 A1* | 1/2018 | Krueger | A61B 5/7257 |
| 2019/0088178 A1 | 3/2019 | Ward | |

FOREIGN PATENT DOCUMENTS

WO 2006030842 A1 3/2006

OTHER PUBLICATIONS

"International Search Report and Written Opinion", dated Nov. 22, 2022, from PCT application PCT/US22/73407.

* cited by examiner

*Primary Examiner* — Phuoc Tran
(74) *Attorney, Agent, or Firm* — John L. Rogitz; John M. Rogitz

(57) ABSTRACT

A user's eyes and if desired head is tracked as the user's gaze follows a moving object on a display. Motion blur of the moving object is keyed to the eye/head tracking. Motion blur of other objects in the frame also may be keyed to the eye/head tracking.

17 Claims, 4 Drawing Sheets

MOTION BLUR COMPENSATION THROUGH EYE TRACKING

FIELD

The present application relates generally to motion blur compensation through eye tracking.

BACKGROUND

Motion blur is typically computed by the motion of an object across a scene. Specifically, for a fast-moving object moving from left to right, a game's renderer may choose to "streak" the motion across the screen.

To achieve motion blur, only camera motion may be accounted for to create a radial blur full-screen, or more selective per-object motion blur may be used by programming a software shader to create a velocity buffer to mark motion intensity for a motion blurring effect on the object. The motion blurring effect causes the object to appear "streaky".

SUMMARY

As understood herein, current motion blur techniques do not account for eye motion (and sometimes the head motion) of the player/viewer. This means that a moving object may be rendered with motion blurring even though the viewer may be following the object with his gaze, in which case in real life the object would not seem motion-blurred.

Accordingly, a system includes at least one computer medium that is not a transitory signal and that in turn instructions executable by at least one processor to execute gaze tracking of a user viewing a display and implement at least one motion blur feature of at least one object presented on the display according to the gaze tracking.

In some examples, the gaze tracking includes one or more of head tracking, eye tracking, and user body motion tracking. Stated differently, a holistic motion accounting may be implemented that accounts for motion of the viewer's eyes, head, and virtual body (which may be sitting in a car/on a train.)

In some embodiments, the instructions can be executable to identify the object as moving across the display, identify the gaze tracking as following the object, and responsive to identifying the object as moving across the display and identifying the gaze tracking as following the object, implement the motion blur feature as being no motion blur of the object.

In example embodiments, the instructions are executable to identify the object as moving across the display, identify the gaze tracking as not following the object, and responsive to identifying the object as moving across the display and identifying the gaze tracking as not following the object, implement the motion blur feature as being motion blur of the object. In such examples the motion blur of the object may be proportional to a difference between a motion vector of the object and a motion vector of the gaze tracking.

In some implementations, the instructions can be executable to identify the object as not moving across the display, identify the gaze tracking as moving relative to the display, and responsive to identifying the object as not moving across the display and identifying the gaze tracking as moving relative to the display, implement the motion blur feature as being motion blur of the object.

A hardware implementation may be offered in which the motion blur feature is implemented at least in part by establishing a first brightness and a first exposure in a first region of the display including the object and establishing a second brightness and/or a second exposure in a second region of the display not including the object.

In another aspect, a method includes implementing first motion blurring of an object presented on a display in accordance with a user's gaze following the object as the object moves and implementing second motion blurring of the first object in accordance with the user's gaze not following the object as the object moves.

In another aspect, an apparatus includes at least one display and at least one processor configured with instructions to identify a first motion vector associated with a viewer of the display, identify a second motion vector associated with an object presented on the display, and implement motion blurring of the object based on the first and second motion vectors.

The details of the present application, both as to its structure and operation, can be best understood in reference to the accompanying drawings, in which like reference numerals refer to like parts, and in which:

DETAILED DESCRIPTION

Figure 1:
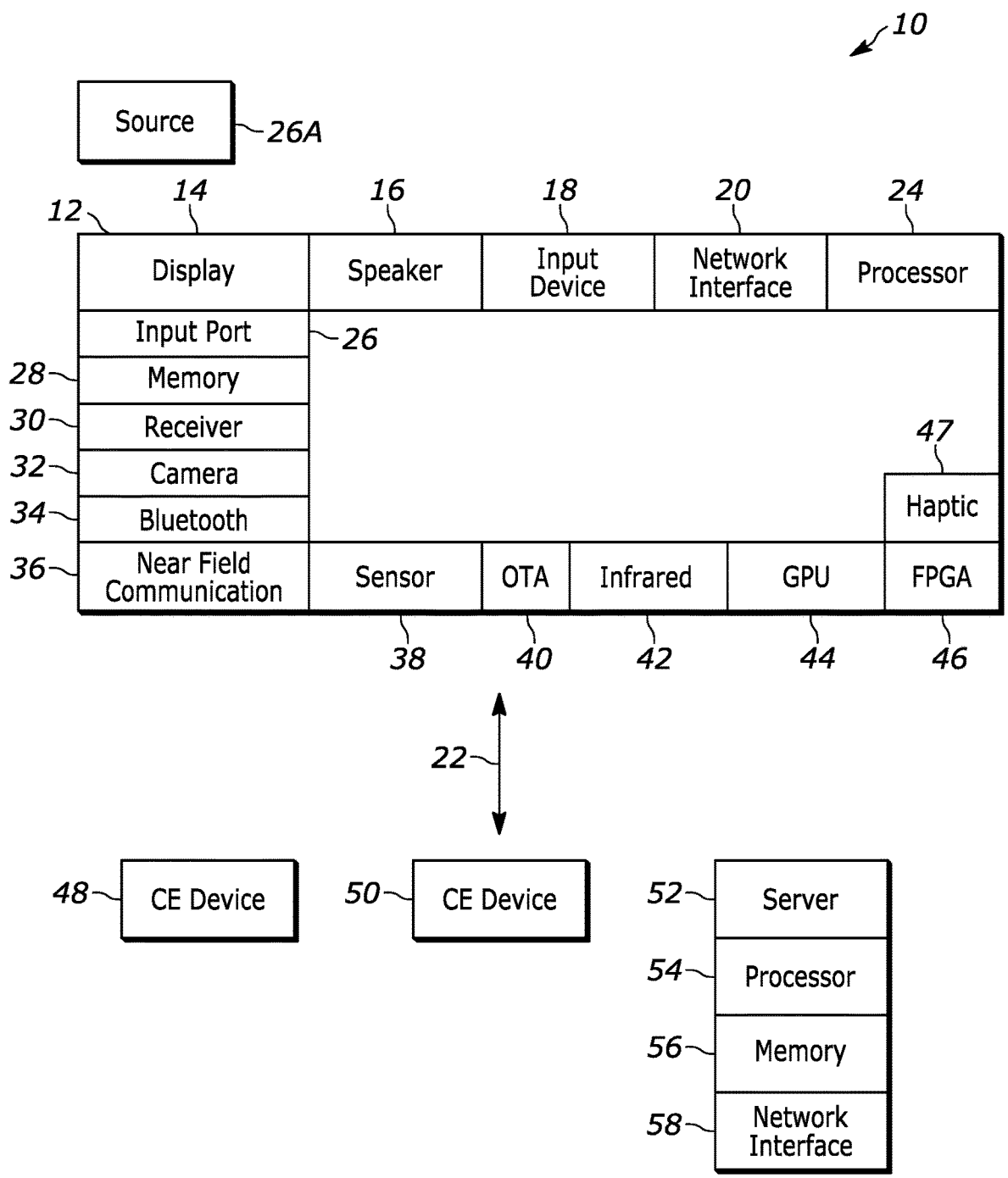
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1.

Figure 2:
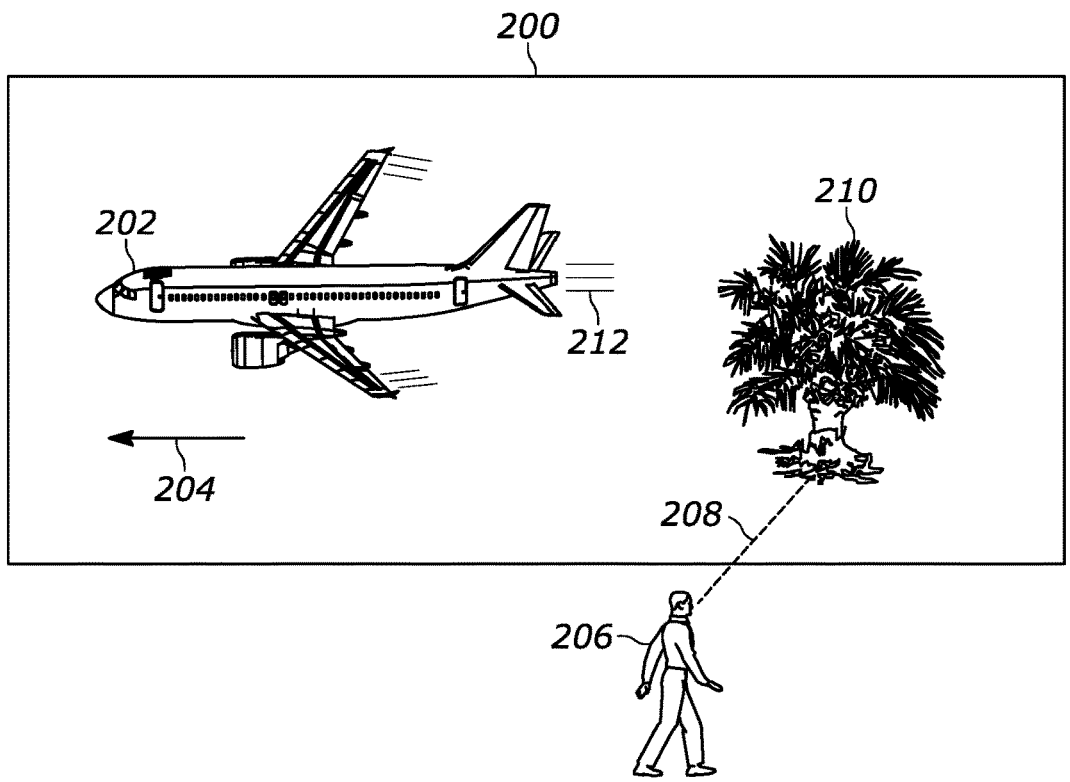
FIG. 2 is a screen shot schematically illustrating a viewer whose point of gaze (POG) remains on a fixed object presented on a display.

FIG. 2 illustrates a display 200 presenting an animated moving object 202, in the example shown, a plane, moving to the left as indicated by the motion vector 204. A viewer 206 has a point of gaze (POG) 208 looking at a stationary object 210 on the display 200, in this case, a tree. Because in the example of FIG. 2 the POG is steadily fixed on the stationary object 210 and is not following the moving object 202, the POG 208 has a motion vector of zero in the direction of travel of the moving object 202, i.e., in the x-dimension. Accordingly, motion blur, indicated by the lines 212, has been applied to the moving object 202 consistent with principles discussed further below. The length of the lines 212 may be proportional to the difference between the magnitude of the motion vector 212 of the moving object 202 and the motion vector of the POG 208. The direction the lines 212 extend away from the moving object 202 may be toward the location of the POG 208.

Figure 3:
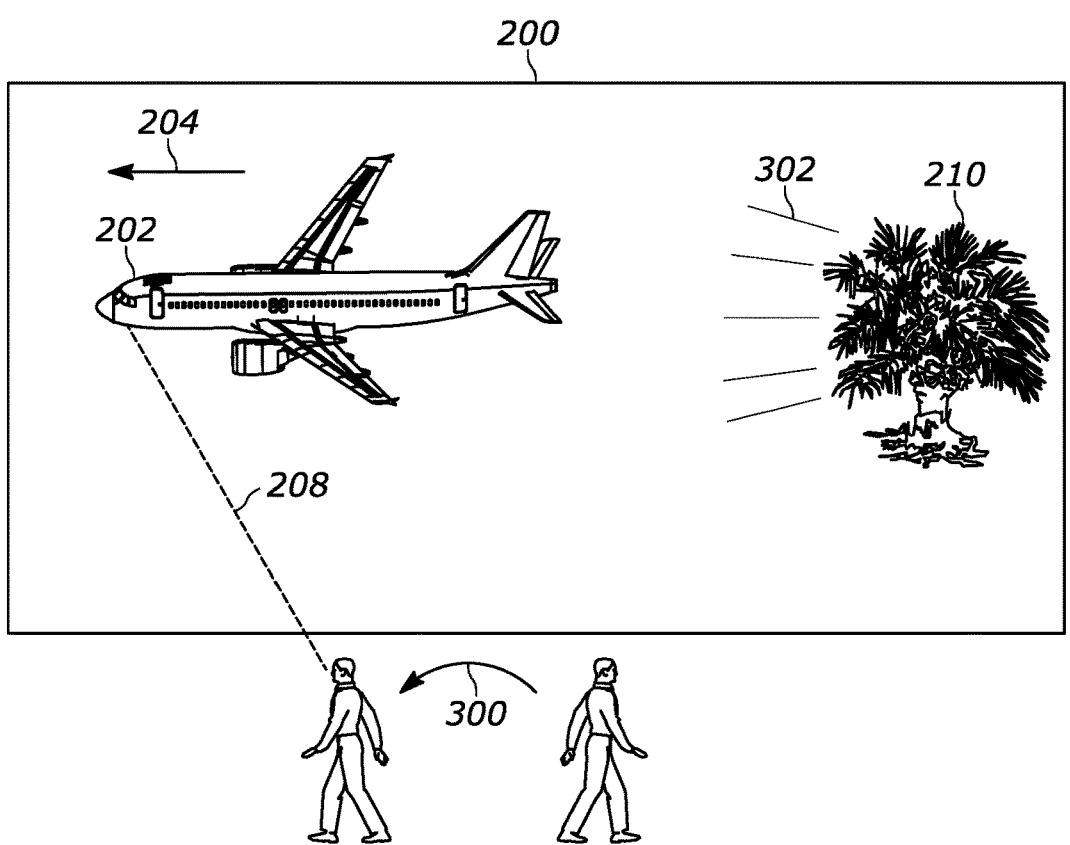
FIG. 3 is a screen shot schematically illustrating a viewer whose POG follows a moving object presented on a display.

Now consider the case of FIG. 3, in which the POG 208 follows the moving object 202 as indicated by the viewer motion vector 300. In this case, it is assumed that the viewer tracks the moving object precisely, meaning that the difference between the magnitudes of the viewer motion vector 300 and object motion vector 204 is zero. Consequently, minimal (in this case, zero) motion blurring is applied to the moving object 202. On the other hand, if desired motion blurring 302 may be applied to the stationary object 210 because the viewer's POG 208 is moving away from the stationary object 210. The length of the lines 302 may be proportional to the difference between the magnitude of the motion vector of the stationary object 210 (which is zero) and the motion vector 300 of the POG 208. The direction the lines 302 extend away from the stationary object 210 may be toward the location of the POG 208.

Figure 4:
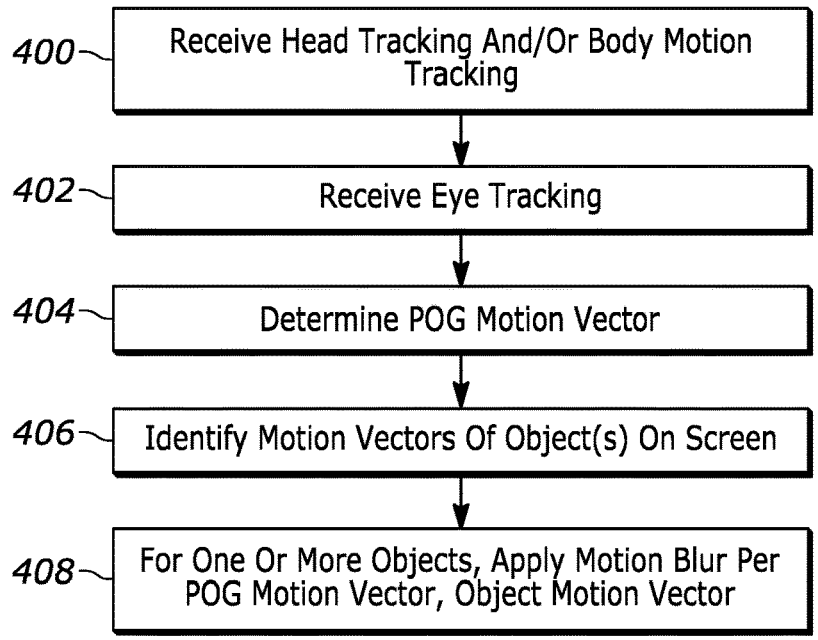
FIG. 4 illustrates example logic in example flow chart format consistent with present principles.

Refer now to FIG. 4. Commencing at block 400, head tracking and/or body tracking (e.g., if the viewer is on a moving platform) may be received, and at block 402 eye tracking may be received. Thus, if desired the motion vector of the viewer's point of gaze (POG) may be determined at block 404 to be the sum of the motion vectors attributable to body motion, head motion, and eye motion, although in some embodiments (e.g., when the display is a HMD and the viewer's eyes are tracked by an internal camera on the HMD) only eye tracking need be used to determine the viewer's POG and any motion of it relative to the display. Combining the various motion vectors into a motion vector for the POG may be done using vector algebra.

Proceeding to block 406, the motion vector(s) of object(s) on the display being viewed by the viewer is/are determined. This may be done by accessing object metadata that may accompany rendering of the computer simulation.

Block 408 then indicates that based on the difference between the motion vector of an object and the motion vector of the POG, motion blur is applied (or not). For example, when the motion vectors indicate that the viewer is following a moving object, no motion blur may be applied to that moving object, whereas if desired motion blurring may be applied to objects that are not moving on the display on the basis of the viewer's POG moving relative to the stationary object. On the other hand, if the viewer is staring at a point in space and not following the moving object, motion blur may be applied to the moving object.

Motion blurring can be achieved through software by blurring the edges/rendering motion lines as shown in FIGS. 2 and 3 consistent with both the direction or motion of the POG and the difference between the motion vectors of a display object and the viewer's POG. In some cases, blurring may happen implicitly (for instance, if the viewer is moving his or her eyes rapidly across a VR HMD, the image may blur in the viewer's eyesight. In some cases, focusing can be implemented by ensuring that the portion of the scene that is being tracked by the eye has reduced or no motion blur.

Figure 5:
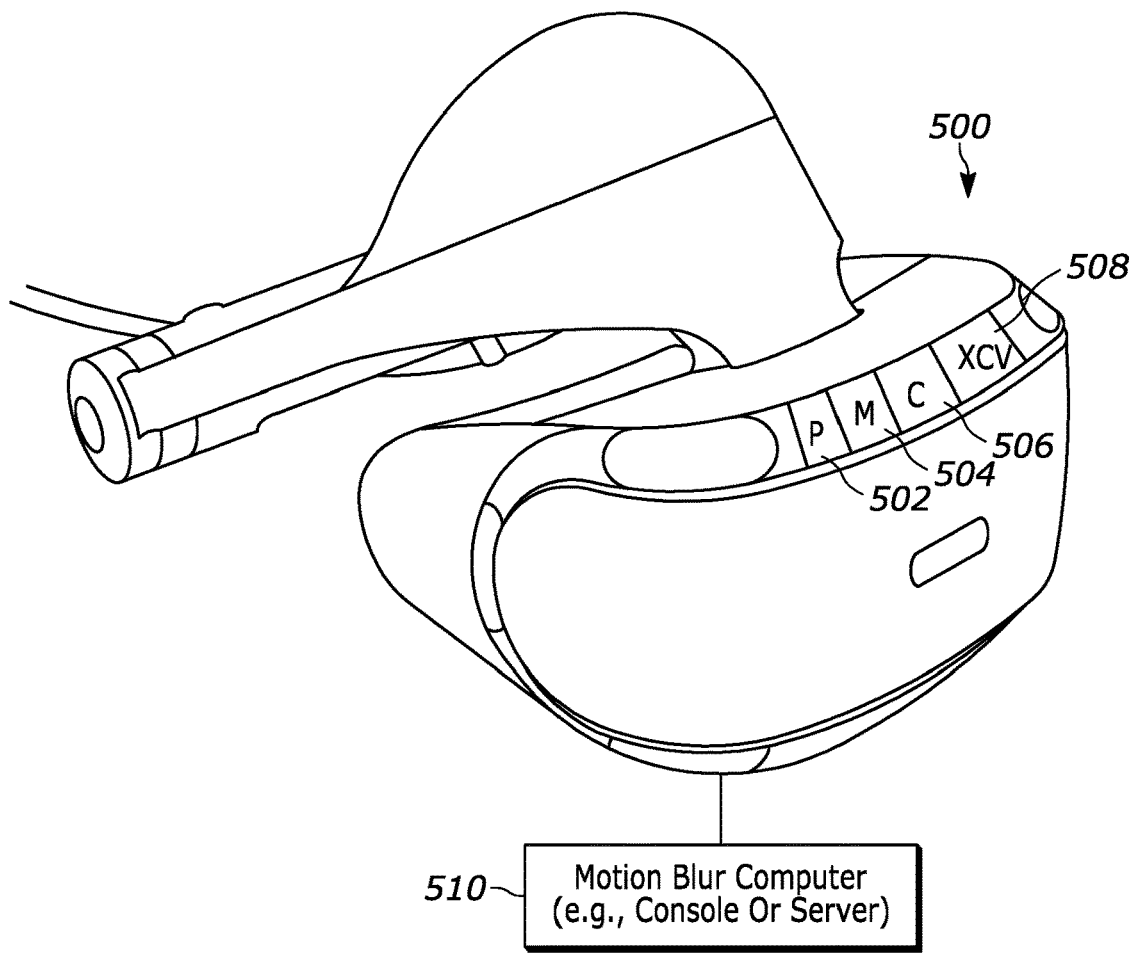
FIG. 5 illustrates an example head-mounted display (HMD) schematically illustrating components of the HMD.

FIG. 5 illustrates a VR HMD 500 that may be implemented using any or all of the components shown in FIG. 1 for the CE device 48, including a position sensor 502, a motion sensor 504 to sense head motion, a camera 506 to track the eyes, and a transceiver 508 for sending signals from the sensors of the HMD to a motion blur computer 510 such as a computer simulation console or server.

Figure 6:
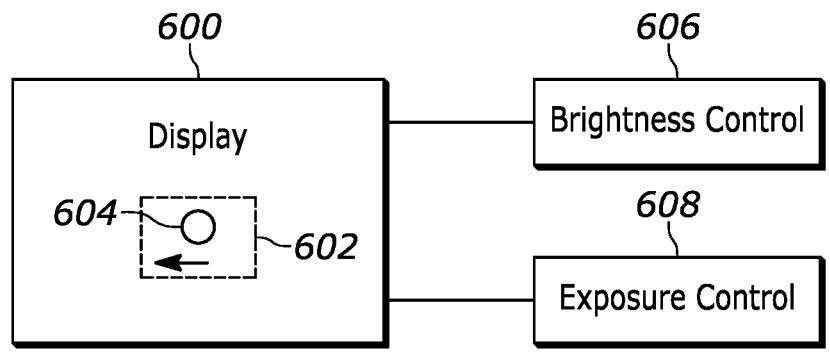
FIG. 6 illustrates an example hardware system implementation.
Figure 7:
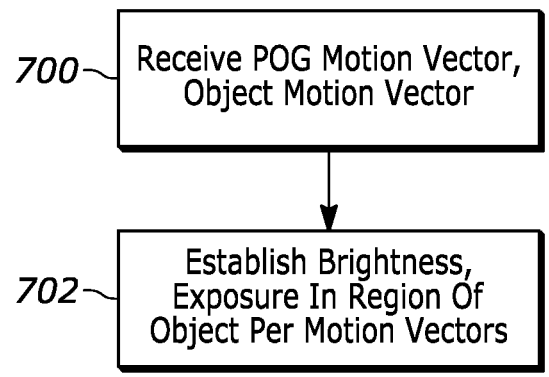
FIG. 7 illustrates example logic in example flow chart format consistent with FIG. 6.

FIGS. 6 and 7 illustrate a hardware assisted embodiment in which a display 600 such as any display herein has the ability to increase the brightness for only a small portion 602 of the display in which an object 604 is presented. A brightness control circuit 606 and exposure control circuit 608 may be provided to selectively alter exposure and brightness for portions of the display 600 such as the portion

602. For example, brightness may be increased, and exposure time reduced to reduce motion blur. In the case of VR HMDs, for example, the screen can be "strobed" to reduce blur, by exposing the image for a short period of time then having a second period which the display is black. A display can have variable exposure time across the whole screen, distributing power and heat to only small portions of the screen to achieve higher exposure but for very short periods. As a concrete example, a display might show an image at 50% brightness for 20% of the time (and 0% brightness for the remaining time). The same number of photons might be delivered if that display uses 100% brightness for only 10% of the time. In the moving object (plane) case of FIGS. 2 and 3, the brightness of the plane can be increased, and the exposure time reduced to reduce blur (FIG. 3), while doing the opposite for FIG. 2, i.e., decreasing brightness for a long exposure, for areas where it is desirable that the eye motion introduces blur.

Blur may be added and removed along one axis and motion due to eyes relative to the display vs motion due to everything else (head, body, etc.) along the other axis.

For the hardware case, a blur/persistence mask may be added as well as the frame buffer. This mask informs the hardware how much to persist the image on a per-pixel/per-region mask. A velocity field as well as the frame buffer may be passed. Asynchronous reprojection may happen closer to the HMD, i.e., the HMD may perform low latency tracking and warp the field of view right before rendering it, so the viewer gets super low latency reprojection, with the blur equivalent of that combining head tracking and/or eye tracking. The HMD could also do a similar action with eyetracking where the eye motion is combined with the velocity field that is passed in to create an up-to-the-moment snapshot of eye to pixel motion deciding whether it wants to adjust blur either through a software filter running on the HMD or adjusting the exposure of the pixels dynamically.

While the particular embodiments are herein shown and described in detail, it is to be understood that the subject matter which is encompassed by the present invention is limited only by the claims.

What is claimed is:

1. A system comprising:
    at least one computer medium that is not a transitory signal and that comprises instructions executable by at least one processor to:
    execute gaze tracking of a user viewing a display; and
    implement at least one motion blur feature of at least one object presented on the display according to the gaze tracking at least in part by:
    establishing a first brightness and a first exposure in a first region of the display including the object; and
    establishing a second brightness and/or a second exposure in a second region of the display not including the object.

2. The system of claim 1, comprising the display and the at least one processor executing the instructions.

3. The system of claim 1, wherein the gaze tracking comprises head tracking.

4. The system of claim 1, wherein the gaze tracking comprises eye tracking.

5. The system of claim 3, wherein the gaze tracking comprises eye tracking.

6. The system of claim 1, wherein the instructions are executable to:
    identify the object as moving across the display;
    identify the gaze tracking as following the object; and
    responsive to identifying the object as moving across the display and identifying the gaze tracking as following the object, implement the motion blur feature as being no motion blur of the object.

7. The system of claim 1, wherein the instructions are executable to:
    identify the object as moving across the display;
    identify the gaze tracking as not following the object; and
    responsive to identifying the object as moving across the display and identifying the gaze tracking as not following the object, implement the motion blur feature as being motion blur of the object.

8. The system of claim 7, wherein the motion blur of the object is proportional to a difference between a motion vector of the object and a motion vector of the gaze tracking.

9. The system of claim 1, wherein the instructions are executable to:
    identify the object as not moving across the display;
    identify the gaze tracking as moving relative to the display; and
    responsive to identifying the object as not moving across the display and identifying the gaze tracking as moving relative to the display, implement the motion blur feature as being motion blur of the object.

10. A method comprising:
    implementing first motion blurring of an object presented on a display in accordance with a user's gaze following the object as the object moves;
    implementing second motion blurring of the object in accordance with the user's gaze not following the object as the object moves; wherein the method comprises changing motion blurring along a first axis motion due to eye motion relative to the display versus body motion along a second other axis.

11. The method of claim 10, wherein the first motion blurring is less than the second motion blurring.

12. The method of claim 10, wherein the object is a first object, and the method comprises:
    implementing motion blurring of a second object presented on the display responsive to the user's gaze moving relative to the display, the second object not moving on the display.

13. An apparatus comprising:
    at least one display; and
    at least one processor configured with instructions to:
    identify a first motion vector associated with a viewer of the display;
    identify a second motion vector associated with an object presented on the display; and
    implement motion blurring of the object based on the first and second motion vectors at least in part by:
    establishing a first brightness and a first exposure in a first region of the display including the object; and
    establishing a second brightness and/or a second exposure in a second region of the display not including the object.

14. The apparatus of claim 13, wherein the processor is configured with instructions to:
    identify the object as moving across the display;
    identify gaze tracking as following the object based at least in part on the first motion vector; and
    responsive to identifying the object as moving across the display and identifying the gaze tracking as following the object, implement minimal motion blurring of the object.

15. The apparatus of claim 13, wherein the processor is configured with instructions to:

identify the object as moving across the display;
identify gaze tracking as not following the object based at least in part on the first motion vector; and
responsive to identifying the object as moving across the display and identifying the gaze tracking as not following the object, implement greater than minimal motion blurring of the object.

16. The apparatus of claim 15, wherein the motion blur of the object is proportional to a difference between the first and second motion vectors.

17. The apparatus of claim 13, wherein the processor is configured with instructions to:
identify the object as not moving across the display;
identify gaze tracking as moving relative to the display at least in part based on the first motion vector; and
responsive to identifying the object as not moving across the display and identifying the gaze tracking as moving relative to the display, implement motion blurring of the object.

* * * * *